(12) United States Patent
Sahlin et al.

(10) Patent No.: US 6,826,226 B1
(45) Date of Patent: Nov. 30, 2004

(54) PREFILTER DESIGN BY SPECTRAL FACTORIZATION

(75) Inventors: Henrik Sahlin, Karlstad (SE); Lars Lindbom, Karlstad (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 675 days.

(21) Appl. No.: 09/688,692

(22) Filed: Oct. 17, 2000

(51) Int. Cl.⁷ .......................... H03H 7/30; G06F 17/10
(52) U.S. Cl. ................................. 375/232; 708/323
(58) Field of Search ........................... 375/229, 230, 375/232, 233, 350; 708/300, 322, 323

(56) References Cited

U.S. PATENT DOCUMENTS 6,507,602 B1 * 1/2003 Dent ........................ 375/350

FOREIGN PATENT DOCUMENTS

EP         1032170 A1    8/2000

OTHER PUBLICATIONS

"Fast Algorithms for the Computation of the Finite Length Decision Feedback Equalizer," IEEE International Conference on Acoustics, Speech, and Signal Processing, vol. 4, Mar. 23–26, 1992, pp. 533–536.*

Anarticle by Gerstackert et al., "An Efficient Method for Prefilter Computation for Reduced–State Equalization", Proceedings of the PIMRC 2000 conference, London, UK, Sep. 18–21, 2000.

An article by Jezek, J. et al. entitled "Efficient Algorithm for Matrix Spectral Factorization", Automatica, vol. 21, No. 6, pp. 663–669, 1985.

Al–Dhahir, Naofal, et al., "Fast Computation of channel–estimate based equalizers in packet data transmission", IEEE Transactions on Signal Processing, vol. 43, No. 11, Nov. 11, 1995, pp. 2462–2473.

Al–Dhahir, N, et al, :Finite–length vs. Infinite–Length MMSE–DFE: The Connection, Proceedings of the Asilomar Conference on Signal, Systems and Computers, Nov. 1–3, 1993, New York, IEEE.

Lang, Tong, et al, "On blind decision feedback equalization", Signal, Systems and Computers, 1996, Conference Record of the 13$^{th}$ Asilomar Conference, Nov. 3–6, 1996, Los Alamitos, IEEE.

Scmidt M., et al., "Fractionally–Spaced Prefiltering for Reduced State Equalization", 1999 IEEE Global Telecommunications Conference. Globecom '99. Rio de Janeiro, Brazil, Dec. 5–9 1999, vol. 5, pp. 2291–2295.

* cited by examiner

Primary Examiner—Betsy L. Deppe (57) ABSTRACT

A baseband signal processing method for calculating minimum phase prefilters. The method preferably utilizes a spectral factorization approach. The prefilter is constructed from a minimum phase version of an estimated channel impulse response. Complex valued filter coefficients are determined by solving a system of linear equations for each iteration of the spectral factorization. The constructed prefilters provide equalization in both the forward and backward directions.

19 Claims, 5 Drawing Sheets

PREFILTER DESIGN BY SPECTRAL FACTORIZATION

BACKGROUND

The present invention relates to communication systems and in particular to baseband signal processing in the receiving parts of base stations and mobile stations. The present invention provides a filter design method using spectral factorization that has a low complexity in implementation of the filter.

The cellular telephone industry has made phenomenal strides in commercial operations in the United States as well as the rest of the world. Growth in major metropolitan areas has far exceeded expectations and is rapidly outstripping system capacity. If this trend continues, the effects of this industry's growth will soon reach even the smallest markets. Innovative solutions are required to meet these increasing capacity needs as well as maintain high quality service and avoid rising prices.

In mobile communication, the transmitted signal is often subjected to a time smearing effect created by the time dispersive nature of the channel, i.e., the air interface between a base station and a mobile station. The channel is estimated in the receiver part of a communication system, and used by the detector to aid in attempting to correctly deduce the information symbols that were transmitted thereto. A commonly used technique for deducing such received information symbols is Maximum Likelihood Sequence Estimation (MLSE) which, implemented using the Viterbi algorithm, is optimal for situations involving Additive White Gaussian Noise (AWGN).

Although the MLSE can be implemented through a computationally efficient Viterbi scheme, the MLSE might nonetheless be very computationally complex if large symbol alphabets are employed or if the number of required taps in the channel estimate is large. In order to reduce the complexity of the Viterbi part of the equalizer, decision feedback can be used. In a Decision Feedback Sequence Estimator (DFSE) equalizer, the estimated channel impulse response is split into two parts. The part which contains the first filter taps is referred to as the MLSE part and the remainder is referred to as the Decision Feedback Estimator (DFE) part.

By implementing this hybrid MLSE/DFE structure, the computational complexity of the detector is reduced, but with some possible loss in performance compared to a pure MLSE detector implementation. If the energy of the channel is concentrated in the first channel taps, i.e. the MLSE part, then the performance loss is small. This can be accomplished by placing a prefilter in the receive signal processing chain. The purpose of the prefilter is to change the characteristic of the channel's impulse response such that the first channel taps are as large as possible. Furthermore, the prefilter should not change the magnitude response of the channel, or color the noise.

Basically, several approaches have been proposed for constructing prefilters. A first approach to prefilter design employs Minimum Mean Square Error (MMSE) techniques. The MMSE prefilter design follows from the design of a pure Decision Feedback Equalizer (DFE). However, the complexity of the MMSE prefilter design is high. Furthermore, the MMSE prefilter may color the noise, making it undesirable as a prefilter for a hybrid MLSE/DFE equalizer since the Viterbi MLSE part is not optimal for signals impacted by colored noise.

Second, allpass filters have been used as prefilters so that the new channel estimate becomes a minimum phase filter. These kinds of prefilters have been designed using a root search algorithm. The root search algorithm consists of an exhaustive sequential search that identifies each root one at a time. For example, in a 7th order channel estimate, seven roots have to be estimated. The first root has to be found using an iterative search method (e.g., Newton Raphson, such as described in Chapter 7 of Söderström and Stoica, *System Identification*, Prentice Hall 1989). Next, the root search method performs long division of the channel estimate with the first root. Thus, a 6th order channel remains after the division. A new iterative search, but now based on this 6th order channel, results in a second root. The method continues the process of iterative search and long division until the channel is reduced to a 4th order system. Then, the remaining four roots can be found by closed form equations. After all the seven roots of the channel estimate are calculated, all roots which are outside the unit circle are mirrored inside the unit circle, which results in a set of seven roots inside the unit circle. Based on this set of roots inside the unit circle, a minimum phase channel is constructed. Also, a prefilter is constructed based on this set of roots. However, the indirect nature of the root search algorithm is computationally complex.

A third approach is described in an article (Gerstacker et al., "An Efficient Method for Prefilter Computation for Reduced-State Equalization", Proceedings of the PIMRC 2000 conference, London, UK, Sep. 18–21, 2000) and related European Patent Application EP 1032170 A1. The third approach consists of calculating a two stage FIR prefilter. The first FIR filter is a matched filter, i.e., the estimated channel conjugated and reversed. The second FIR filter consists of (a FIR approximation of) the inverse of the minimum phase version of the channel filter, which is also conjugated and reversed. The latter FIR filter is calculated from the solution of a set of Yule-Walker equations. This approach is more sensitive to truncation in the FIR approximations due to the two stage filtering, compared to the method described in the present document. Additionally, in section three of the article the authors detail other approaches that have lead to unsatisfactory solutions due to computational complexity. Among these other approaches is a spectral factorization technique which uses the cepstrum of the channel autocorrelation sequence. The authors note that the computational complexity is quite high and requires extensive logarithmic and exponential operations.

A spectral factorization technique which does not use the cepstrum is described in an article by Jezek, J., and Kucera, V., "Efficient Algorithm for Matrix Spectral Factorization", Automatica, Vol. 21, No. 6, pp. 663–669, 1985. However, this method is designed for real valued filter coefficients and does not allow for complex valued filter coefficients.

Thus, it would be desirable to generate new prefilter designs which are low in complexity, which do not color the noise, and which are implemented in a single stage while at the same time concentrating signal energy in the MLSE taps of the detector.

SUMMARY

It should be emphasized that the terms "comprises" and "comprising", when used in this specification, are taken to specify the presence of stated features, integers, steps or components; but the use of these terms does not preclude the presence or addition of one or more other features, integers, steps, components or groups thereof.

The present invention describes a spectral factorization method that is a low complexity alternative way of constructing prefilters, requiring a fraction of the computational complexity compared to conventional prefilter designs. Furthermore, the prefilter design of the present invention does not color the signal noise and operates as an allpass filter and can be realized in a single stage. Still further, the required program memory is significantly reduced by the spectral factorization method that does not involve using the cepstrum of the channel autocorrelation sequence or require extensive logarithmic and exponential operations. The spectral factorization method also is less sensitive to quantization noise in signals and channel estimates. Additionally, the invention describes how to construct prefilters to be used for equalization in both the forward and backward direction.

The present invention overcomes the computational complexity and inefficiency of the root search algorithm by directly calculating a minimum phase version, G(z), of a channel estimate, H(z) and calculating the prefilter from the minimum phase. One exemplary method provides for determining filter coefficients in a communication system by estimating a channel over which signals have been transmitted and determining the filter coefficients for a filter from the channel estimator using a spectral factorization method. Another exemplary method begins by initializing coefficients of the minimum phase filter, g, to coefficients of a spectrum of a channel estimate, s, wherein each coefficient numbers from 0 to L. An outer iterative loop starts by calculating a division factor, $\gamma_0$, from a complex conjugate of a first coefficient of the minimum phase filter G(z). The outer iterative loop starts by calculating a next $L^{th}$ coefficient, $X_L$, of the minimum phase filter by multiplying the $L^{th}$ term of the spectrum with the division factor. A value m (starting at m=L−1) of an inner iterative counter is used and the next $m^{th}$ coefficient, $x_m$, is calculated by an equation as follows:

$$x_m = \left(s_m - \sum_{i=m+1}^{L} x_i g_{i-m}^*\right)\gamma_0$$

wherein g* is the complex conjugate of g. The value m is checked to see if m is equal to zero. If m is not zero, the value m is decreased by one and the process loops back to the start of the inner iterative loop. If m is equal to zero, the coefficients of the minimum phase filter, g, are set equal to the next coefficients of the minimum phase filter, x, for each coefficient from 0 to L. An outer iterative loop criteria is then checked. If the outer iterative loop criteria is met the process ends. If the outer iterative loop criteria is not met the process loops back to the start of the outer iterative loop.

The above features and advantages of the present invention will be more apparent and additional features and advantages of the present invention will be appreciated from the following detailed description of the invention made with reference to the drawings.

BRIEF DESCRIPTION OF THE DRAWINGS

The present invention will now be described with reference to the following figures, in which.

DETAILED DESCRIPTION

In the following description, for purposes of explanation and not limitation, specific details are set forth, such as particular circuits, circuit components, techniques, etc. in order to provide a thorough understanding of the present invention. However, it will be apparent to one skilled in the art that the present invention may be practiced in other embodiments that depart from these specific details. In other instances, detailed descriptions of well-known methods, devices, and circuits are omitted so as not to obscure the description of the present invention.

The exemplary radio communication systems discussed herein are based upon the time division multiple access ("TDMA") protocol, in which communication between the base station and the mobile terminals is performed over a number of time slots. However, those skilled in the art will appreciate that the concepts disclosed herein find use in other protocols, including, but not limited to, frequency division multiple access ("FDMA"), code division multiple access ("CDMA"), or some hybrid of any of the above protocols. Likewise, some of the exemplary embodiments provide illustrative examples relating to the GSM or IS-136 type of systems; however, the techniques described herein are equally applicable to radio communication systems operating in accordance with any specification.

Figure 8:
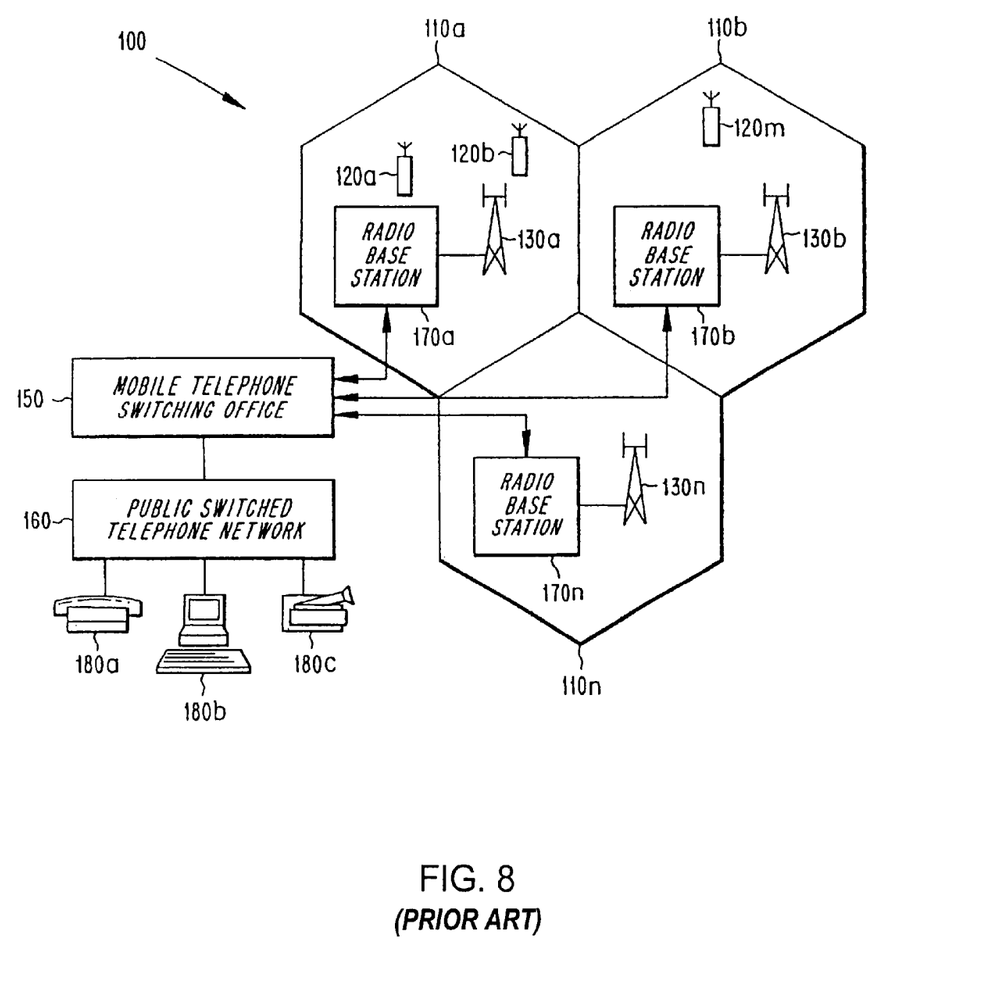
FIG. 8 is a block diagram of a conventional radio communication system.

Prior to discussing exemplary embodiments according to the present invention, FIG. 8 will now be described which illustrates a general radio communication system 100 in which the present invention can be implemented. The radio communication system 100 includes a plurality of radio base stations 170a–n connected to a plurality of corresponding antennas 130a–n. The radio base stations 170a–n in conjunction with the antennas 130a–n communicate with a plurality of mobile terminals (e.g. terminals 120a, 120b, and 120m) within a plurality of cells 110a–n. Communication from a base station to a mobile terminal is referred to as the downlink, whereas communication from a mobile terminal to the base station is referred to as the uplink.

The base stations are connected to a mobile telephone switching office ("MSC") 150. Among other tasks, the MSC coordinates the activities of the base station, such as during the handoff of a mobile terminal from one cell to another. The MSC, in turn, can be connected to a public switched telephone network 160, which services various communication devices 180a, 180b, and 180c. Both the mobile terminals 120a, 120b, and 120m, and the base stations 170a–n can incorporate prefilter design structures and techniques according to the present invention.

A detailed description of prefilter design and prefiltering according to the present invention is given below. The description contains examples using the burst format defined for the GSM standard, but as will be appreciated by those skilled in the art the invention is not limited to this particular standard and can be implemented in communication systems designed in accordance with other standards.

Figure 1:
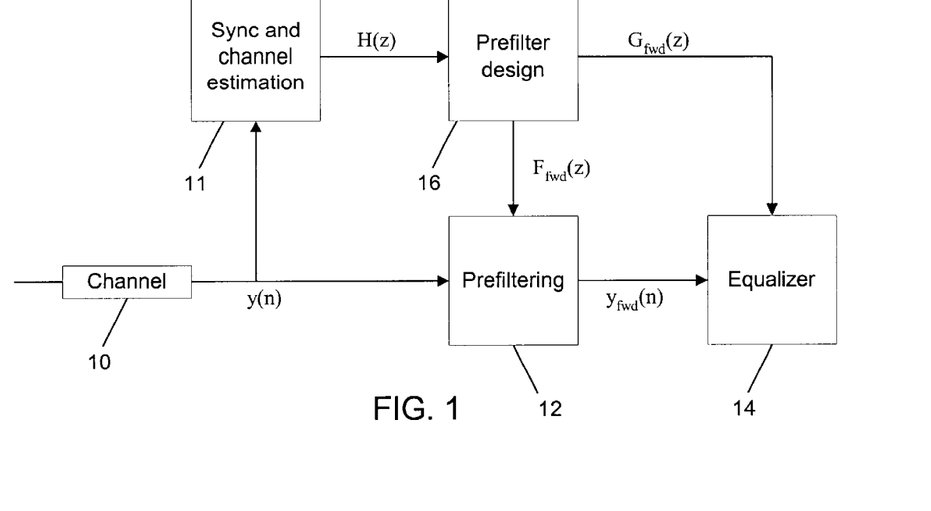
FIG. 1 shows a block diagram of the parts of the baseband signal processing with an equalizer of decision feedback type.

An exemplary block diagram of a receiver chain, and a time dispersive channel over which a signal can be transmitted, is illustrated as FIG. 1. A synchronization and channel estimator unit 11 produces a channel estimate H(z) of the channel 10. The received signal y(n) is prefiltered with the prefilter 12, using filter coefficients established by the transfer function $F_{fwd}(z)$. The output of prefilter 12 results in the signal $Y_{fwd}(n)$. The minimum phase (MP) filter $G_{fwd}(z)$, is generated in prefilter design block 16. The minimum phase filter, $G_{fwd}(z)$, is used by the equalizer 14 and has its energy concentrated to the first filter taps.

Figure 2:
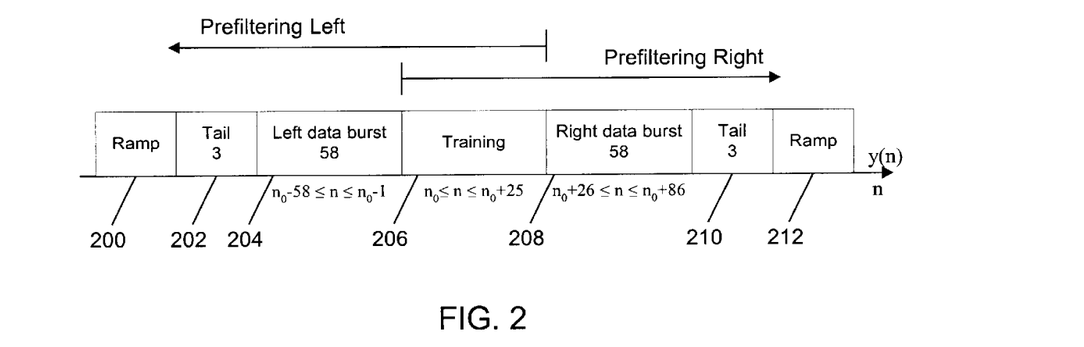
FIG. 2 illustrates the prefiltering of the right and left data parts for the GSM system.

The prefilter design results in two versions of each filter, one to be used in the forward direction of the burst (with index fwd), and one for the backward direction (with index bwd), as shown in FIG. 2. Therein, data portions defined for frames in the GSM system are illustrated and consist of a ramp block 200 and tail block 202 proceeding the left data burst 204 and training block 206 followed by the right data burst 208, tail 210 and ramp 212 blocks. The filter for the forward direction is used for equalization of the right half of the data burst, from training 206 to ramp 212, and the backward version for equalization of the left half of the burst, from training 206 to ramp 200.

One property of a minimum phase filter $G(z)$ is that all the roots of the filter polynomial are located inside the unit circle. This property will be used in the analysis below. This property of a minimum phase filter will also result in prefilters which are allpass filters, i.e. in prefilters having a substantially flat frequency response. These prefilters are of an Infinite Impulse Response (IIR) type, with a rational transfer function given as:

$$F(z) = \frac{B(z)}{A(z)} \quad (1)$$

where each root $z_i$ of the numerator $B(z_i)=0$ is located outside the unit circle. The roots of the denominator are $1/z_i^*$, i.e. the roots of the numerator mirrored in the unit circle. These IIR filters can be approximated by Finite Impulse Response (FIR) filters. In general, IIR filters are avoided in fixed point DSP implementations since rounding errors might result in unstable filters. Furthermore, as will be clarified in the section below regarding prefilter design, this approximation is useful in the design of prefilters based on the spectral factorization method.

An example of a spectral factorization algorithm according to an exemplary embodiment of the present invention is given below. This iterative algorithm is designed to deal with complex valued filter coefficients. Furthermore, the algorithm leads to a simple system of linear equations to be solved for each iteration, thereby facilitating implementation of the prefilter design.

For example, denote the Z-transform of the channel estimate by:

$$H(z) = h_0 z^L + h_1 z^{L-1} + \ldots + h_L. \quad (2)$$

This channel estimate is in general not minimum phase. The purpose of the spectral factorization method is to find a minimum phase channel $G(z)$ such that:

$$|H(e^{j\omega})|^2 = |G(e^{j\omega})|^2, \ 0 \leq \omega < 2\pi \quad (3)$$

where:

$$H(z)|_{z=e^{j\omega}} = H(e^{j\omega}). \quad (4)$$

The magnitude response is thus identical for $H(z)$ and $G(z)$ but the phase responses are different. The spectrum of the channel estimate is:

$$S(z) = H(z)H^*(z^{-1}) \quad (5)$$
$$= s_{-L} z^L + s_{-L+1} z^{L+1} + \ldots + s_0 + \ldots + s_{L-1} z^{-L-1} + s_L z^{-L}$$

Since $H(z)$ has complex valued coefficients in general, this spectrum has complex conjugated symmetric coefficients, i.e. $s_{-i} = s_i^*$.

The minimum phase version of the channel estimate is modeled as:

$$G(z) = g_0 z^L + g_1 z^{L-1} + \ldots + g_L. \quad (6)$$

The coefficients of the spectrum $S(z)$ can be expressed through the coefficients of $G(z)$ as:

$$s_m = \sum_{i=0}^{L-m} g_i^* g_{i+m} \text{ for } 0 \leq m \leq L, \quad (7)$$

or, equivalently, in a matrix formulation:

$$s = \begin{bmatrix} s_0 \\ s_1 \\ \ldots \\ s_L \end{bmatrix} = \begin{bmatrix} g_0 & g_1 & \cdots & g_L \\ 0 & g_0 & \cdots & g_{L-1} \\ & & 0 & \cdots \\ 0 & & 0 & g_0 \end{bmatrix}^* \begin{bmatrix} g_0 \\ g_1 \\ \ldots \\ g_L \end{bmatrix} = T^*(g)g. \quad (8)$$

The criteria which is considered is:

$$V = \|s - T^*(g^{(k-1)})g^{(k)}\| \quad (9)$$

where $g^{(k)}$ denotes the estimated coefficients at iteration k and $g^{(k-1)}$ denotes the previously estimated coefficients. The algorithm for finding a minimum phase channel is based on finding values of the coefficients of $g^{(k)}$ such that the criteria V in equation (9) is minimized. The derivative of V with respect to $g^{(k)}$ is $T^*(g^{(k-1)})$. A Newton Raphson search, is thus:

$$g^{(k+1)} = g^{(k)} + T^{*-1}(g^{(k)})(s - T^*(g^{(k)})g^{(k)}) = (T^*(g^{(k)}))^{-1} s \quad (10)$$

where $g^{(k-1)}$ has been replaced by $g^{(k)}$. Repeat equation (10) until:

$$V = \|s - T^*(g^{(k-1)})g^{(k)}\| < \epsilon \quad (11)$$

for some value of $\epsilon$. The stop limit of the criteria, $\epsilon$, is a design variable the value of which determines the requested accuracy of the minimum phase channel. The vector g is initiated, for k=0 as:

$$g^{(0)} = s. \quad (12)$$

Those skilled in the art will appreciate that other values, e.g., within the unit circle, can be used to initiate vector g. If the values specified for initialization of the vector g are outside the unit circle, then a maximum phase filter will be generated, from which the minimum phase can be obtained. Experiments have indicated that equation (10) should be iterated approximately 10 times for a GSM channel to provide sufficient accuracy. Those skilled in the art will appreciate that the number of iterations can be greater or less than 10. Spectral factorization methods according to the present invention permit determining complex valued filter coefficient using a relatively few number of iterations, e.g., less than about 30. The system of equations in equation (10) can be solved in approximately $\frac{1}{2}L^2$ multiplications. It may be desirable to implement algorithms according to the present invention using a fixed number of iterations instead of permitting a variable number of iterations halted by a limit on the criteria in order to be able to exactly predict the computational requirements for the algorithm.

Solving triangular and Toeplitz systems

The algorithm for finding the spectral factor $G(z)$ is $$g^{(k+1)} = (T^*(g^{(k)}))^{-1} s. \quad (13)$$

Let $x=g^{(k+1)}$, $g=g^{(k)}$ and solve the following system of equations for x:

$$\begin{bmatrix} s_0 \\ s_1 \\ \ldots \\ s_{L-1} \\ s_L \end{bmatrix} = \begin{bmatrix} g_0 & g_1 & \ldots & g_{L-1} & g_L \\ 0 & g_0 & & & g_{L-1} \\ \ldots & & & & \ldots \\ 0 & \ldots & 0 & & g_0 \end{bmatrix}^* \begin{bmatrix} x_0 \\ x_1 \\ \ldots \\ x_{L-1} \\ x_L \end{bmatrix}. \quad (14)$$

Starting with the last row of equation (14) yields the solution to $x_L$ as:

$$x_L = s_L/g_0^*. \quad (15)$$

The value of $x_{L-1}$ can now be computed as:

$$x_{L-1} = (s_{L-1} - x_L g_1^*)/g_0^*. \quad (16)$$

The system is solved by iterating upwards in the system of equations (14). Note that the calculations above can be performed using only additions, multiplications and one division. The division is performed by defining:

$$\gamma_0 = 1/g_0^* \quad (17)$$

and inserting $\gamma_0$ instead of $1/g_0^*$ above. The absolute value of $g_0^*$ is not close to zero since it is the first coefficient of a minimum phase filter. The algorithm is illustrated below and in FIG. 3.

Figure 3:
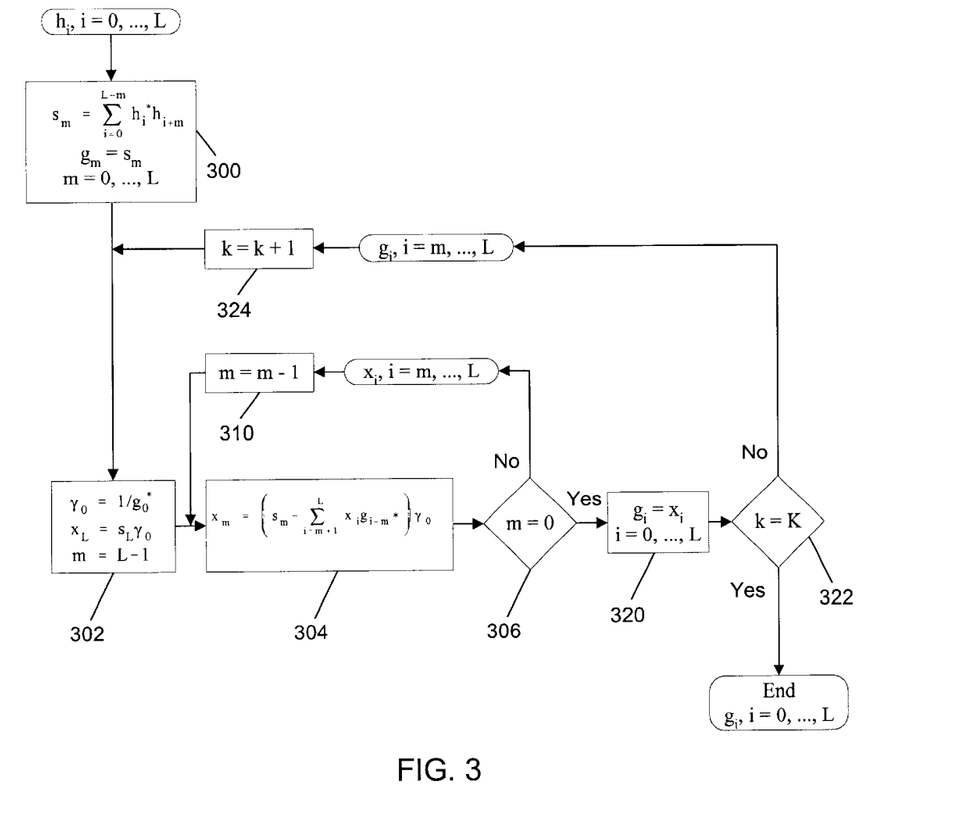
FIG. 3 is a flow diagram of the iterations for spectral factorization according to the present invention.

Referring to FIG. 3, block 300 initializes $g_i = s_i$ for $m=0, \ldots, L$. Next in block 302, $\gamma_0$, $x_L$ and counter m are all initialized. Blocks 304, 306 and 310 form an inner iterative loop that solves equation (14) by sequentially solving for $x_m$ at each iteration. An outer iterative loop is formed by blocks 302, 320, 322 and 324. In decision block 306, when m has counted down to zero, the process proceeds to block 320 and sets $g_i = x_i$, ($g^{(i)} = g^{(i+1)}$, see equations (13) and (14)). The process then continues to block 322 to check if the outer counter k is equal to K. Upon a negative decision in block 322, the process increments counter k in block 324 and feeds the updated values for $g_i$ into block 302. The process then continues until the k=K in decision block 322.

The spectral factorization method, that corresponds to FIG. 3, is presented below in pseudo code to further illustrate the present invention.

```
for m = 0 to L s_m = Σ_{i=0}^{L-m} h_i* h_{i-m}    /* Calculate spectra* / g_m = s_m       /* Copy result from s to g* / end for k = 0 to K - 1

γ_0 = 1/g_0* x_L = s_L γ_0    /* The last row of (14)* / for m = L - 1 down to 0   /* Iteration upwards in (14)* / x_m = (s_m - Σ_{i=m+1}^{L} x_i g_{i-m}*) γ_0 end for m = 0 to L    /* Copy result from x to g* / g_m = x_m
```

-continued
```
    end end.
```

Prefilter Design

Forward Prefilter Calculation

A forward prefilter calculation is described wherein the result from the iterative solution above (coefficients $g_i$) is denoted as $G_{min}(z)$ which is the minimum phase version of H(z). This minimum phase filter is used for the DFSE of the right data burst, i.e. in the forward direction:

$$G_{fwd}(z) = G_{min}(z). \quad (18)$$

The channel estimate is modeled by:

$$H(z) = \prod_{z_i \in Q_{in}} (z - z_i) \prod_{z_i \in Q_{out}} (z - z_i) \quad (19)$$

where the roots inside and outside the unit circle are denoted by:

$$z_i \in Q_{out} \text{ if } |z_i|^2 \geq 1 \text{ and } z_i \in Q_{in} \text{ if } |z_i|^2 < 1 \text{ respectively.} \quad (20)$$

The estimated minimum phase version of H(z) has the following structure:

$$G_{fwd}(z) = \prod_{z_i \in Q_{in}} (z - \tilde{z}_i) \prod_{z_i \in Q_{out}} \left(z - \frac{1}{\tilde{z}_i^*}\right) \quad (21)$$

where the tilde above in the $\tilde{z}_i$ roots indicates the error in the calculation of $G_{min}$ by the spectral factorization.

The prefilter for the forward direction can be expressed as:

$$F_{fwd}(z) = \frac{G_{fwd}(z)}{H(z)} = \prod_{z_i \in Q_{out}} \frac{z - 1/\tilde{z}_i^*}{z - z_i} \prod_{z_i \in Q_{in}} \frac{z - \tilde{z}_i}{z - z_i} \quad (22)$$

The second factor on the right hand side of equation (22) can be neglected when the estimated $G_{min}$ has roots close to the roots, inside the unit circle, of H(z). Note that $F_{fwd}(z)$ is an allpass filter when the second factor is small, which implies a flat frequency spectrum. The IIR filter in equation (22) is not used directly in causal filtering since the denominator contains roots outside the unit circle. Moreover, this filter is not readily implemented in noncausal filtering either due to the presence of roots inside the unit circle. This IIR prefilter can, instead, be approximated by a FIR filter by using a long division to approximate the denominator of the polynomial. Of course, since this is an approximation it will introduce error. The error in this long division, or approximation of the denominator of the polynomial, typically should decrease as the number of FIR taps increases. However, H(z) contains roots both inside and outside the unit circle, which should not be problematic for the long division since $G_{fwd}$ and H(z) contain some common roots inside the unit circle which should cancel each other. However, due to possible estimation errors in the spectral factorization, these roots may not cancel completely resulting in a situation where the error in the approximation of the FIR filter actually increases when the number of FIR taps is increased.

To provide for a better approximation, the present invention provides an alternative technique wherein one first computes:

$$F_f(z) = \frac{H(z)}{G_{fwd}(z)} = f_0 z^M + f_1 z^{M-1} + \ldots + f_M, \quad (23)$$

where M is the number of taps in the FIR approximation of the IIR filter. Simulations have indicated that M should be some 2–3 times larger than L. The forward filter $F_{fwd}$ is obtained by reversing the order and conjugation of the coefficients of $F_f(z)$ or, equivalently, $$F_{fwd}(z) = \alpha_f z^M F_f^*(z^{-1}) \quad (24)$$

where $\alpha$ is a constant which scales the forward filter without changing the filter performance:

$$\alpha_f = \prod_{z_i \in Q_{out}} z_i z_i^*. \quad (25)$$

The long division above, in equation (24), is an approximation of an IIR filter with a FIR filter. The error in this approximation will then decrease when the number of coefficients M of the FIR filter increase. It is thus desirable that the prefilter $F_{fwd}$ is computed as outlined in equations (23) and (24) instead of equation (22).

Backward Prefilter Calculation

In calculating a backward prefilter, let:

$$\overline{H}(z) = z^L H(z^{-1}) \quad (26)$$

where the overbar thus denotes a reversing of the coefficients. The overbar also indicates a filter to be used on the reversed signal. This reversed polynomial has roots at:

$$\overline{H}(z) = \prod_{z_i \in Q_{in}} \left(z - \frac{1}{z_i}\right) \prod_{z_i \in Q_{out}} \left(z - \frac{1}{z_i}\right) \quad (27)$$

The backward minimum phase filter is now a filter which is a minimum phase version of $\overline{H}(z)$. This backward filter can be expressed as:

$$\overline{G}_{bwd}(z) = \prod_{z_i \in Q_{in}} (z - \tilde{z}_i^*) \prod_{z_i \in Q_{out}} \left(z - \frac{1}{\tilde{z}_i}\right) \quad (28)$$

By comparing equations (18), (21) and (28) it follows that the backward minimum phase filter is computed as:

$$\overline{G}_{bwd}(z) = G_{min}^*(z) \quad (29)$$

i.e. the backward filter is achieved by conjugating the coefficients of the minimum phase version of the estimated channel filter. The prefilter to be used in the backward direction is:

$$\overline{F}_{bwd}(z) = \frac{\overline{G}_{bwd}(z)}{\overline{H}(z)} = \prod_{z_i \in Q_{in}} \frac{z - \tilde{z}_i^*}{z - 1/z_i} \prod_{z_i \in Q_{out}} \frac{z - 1/\tilde{z}_i}{z - 1/z_i}. \quad (30)$$

The second factor on the right hand side of equation (30) can be neglected when the estimated $\overline{G}_{bwd}$ has roots close to the roots, inside the unit circle, of $\overline{H}(z)$. Note that $\overline{F}_{bwd}(Z)$ is an allpass filter, when the second factor is small, which implies a flat spectrum. This prefilter can be approximated by a FIR filter with M taps by using long division. But, as described above, since $\overline{H}(z)$ contains roots both inside and outside the unit circle, this long division is not numerically efficient. To improve on the above long division method, first compute:

$$F_b(z) = \frac{\overline{H}(z)}{\overline{G}_{bwd}(z)} = f_0 z^M + f_1 z^{M-1} + \ldots + f_M. \quad (31)$$

The backward filter $F_{bwd}$ is obtained by reversing the order and conjugation of the coefficients of $F_b(z)$, or, equivalently, $$\overline{F}_{bwd}(z) = \alpha_b z^M F_b^*(z^{31\ 1}) \quad (32)$$

where:

$$\alpha_b = \prod_{z_i \in Q_{in}} z_i z_i^*. \quad (33)$$

Allpass Properties

The whiteness of prefilters designed according to the spectral factorization methods described herein depends on the number of iterations of equation (10) (and the error in the approximation of the IIR prefilter with an FIR filter) which are preferred. This can be seen in equation (22) and (30) where the accuracy of the spectral factorization is modeled by the closeness of $\tilde{z}_i$ to $z_i$.

In the prefilter design by the root search method, the roots of the channel filter $\hat{z}$ for i=1, . . . , L, are explicitly calculated. The prefilter is calculated directly from these estimates as:

$$F_{fwd, root} = \prod_{z_i \in Q_{out}} \frac{z - 1/\hat{z}_i^*}{z - \hat{z}_i}. \quad (34)$$

The prefilter is then, by construction, an allpass filter, as long as the FIR approximation of equation (34) is not truncated too early. The minimum phase filter is then constructed by a convolution of this prefilter by the original channel filter. To further appreciate various qualities of filter design according to the present invention, consider the following simulation results.

Figure 4:
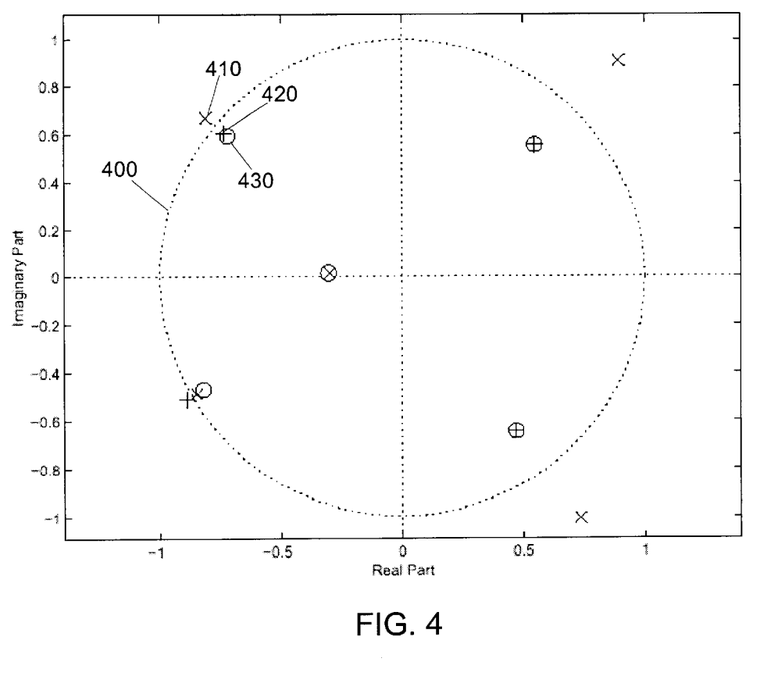
FIG. 4 is a graph of the roots of a channel in a GSM system and the roots of the resulting from the spectral factorization method.

Referring to FIG. 4, the roots of a channel filter and corresponding roots mirrored in the unit circle for a Hilly Terrain channel, as defined by GSM specification 5.05, are shown. Three sets of symbols illustrate these roots. The first set of symbols are the roots of channel filter (+), such as 420. The second set of symbols are the roots mirrored inside the unit circle (x), such as 410. The third set of symbols are the roots of the minimum phase filter found by the spectral factorization, as described above, are displayed as circles (○), such as 430. The roots found by the spectral factorization method were identified by iterating equation (10) ten times. FIG. 4 illustrates a minimum phase filter and its relationship to a channel filter that is not minimum phase. The spectral factorization method yields, as is shown by a comparison of the roots, essentially the same minimum phase filter. The spectral factorization method of the present invention achieves this result using significantly less processing power than conventional methods. All roots of the channel filter are not shown in FIG. 4, because one root lies significantly outside the unit circle. Table 1 lists the values as plotted in FIG. 4, and all the roots for the channel filter.

TABLE 1

| Roots of the channel filter | Roots mirrored in the unit circle | Roots of the minimum phase filter |
| --- | --- | --- |
| 0.5489 + 0.5581i | 0.8958 + 0.9107i | 0.5489 + 0.5581i |
| 0.4720 − 0.6543i | 0.7384 − 1.0095i | 0.4720 − 0.6453i |
| −0.7338 + 0.6072i | −0.8089 + 0.6694i | −0.7338 + 0.6072i |
| −0.8871 − 0.5104i | −0.8469 − 0.4873i | −0.8469 − 0.4873i |
| −3.2978 + 0.1205i | −0.3028 + 0.0111i | −0.3028 + 0.0111i |

Figure 5:
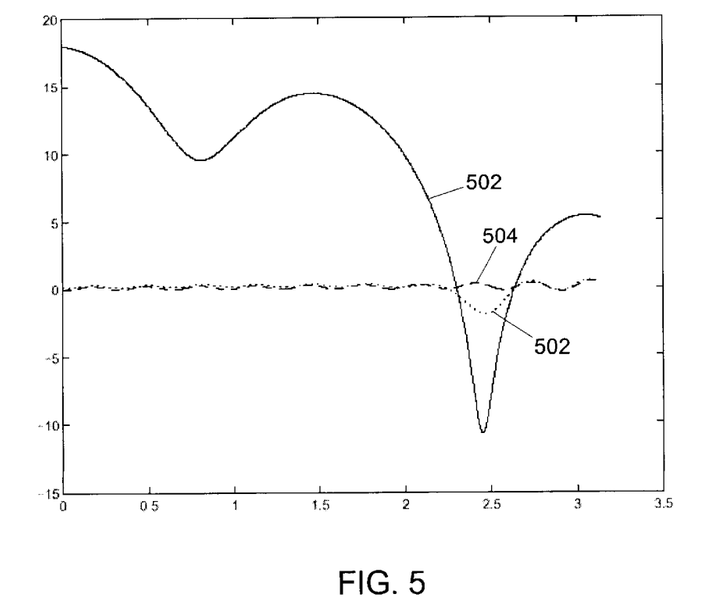
FIG. 5 is a graph of the spectra of a channel in a GSM system and spectra of prefilters from various design methods.

The graph of FIG. 5 shows the spectrum of the channel filter 502, which corresponds to the channel filter of FIG. 4. The spectra of the prefilters from the root search algorithm 504 and from the spectral factorization 506 are also shown. It can be seen that the spectrum of the root search 504 is flatter than the spectrum of the spectral factorization prefilter 506. The minimum phase filter estimate becomes more accurate as the number of iterations of the spectral factorization is increased. An increase in the number of iterations also results in a flatter ("whiter") spectrum of the prefilter, i.e. a more ideal allpass response. However, an increase in the number of iterations also increases processing time. Therefore, the number of iterations performed should provide an acceptable result, while minimizing processing time, especially for real time systems.

Figure 6:
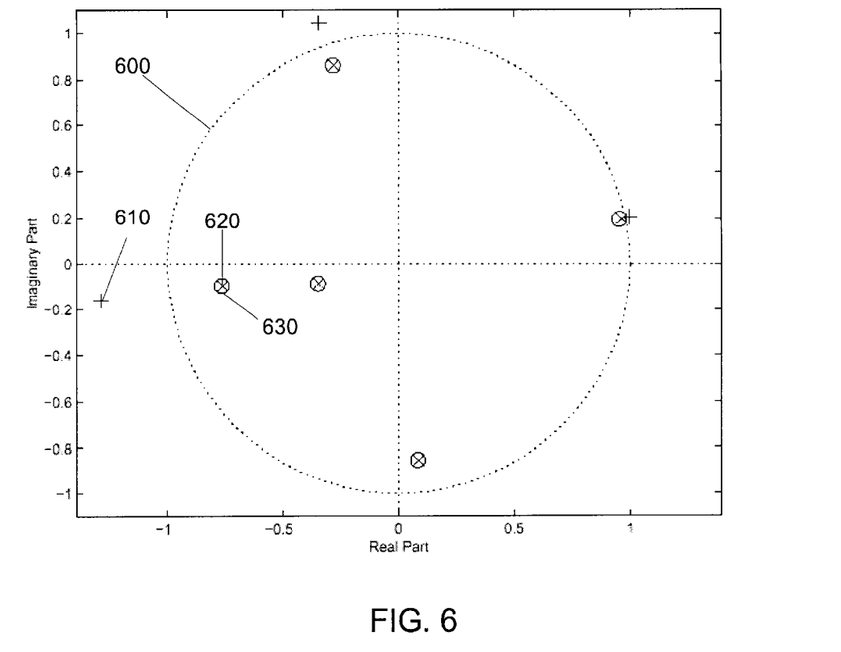
FIG. 6 is a graph of the roots of another channel in a GSM system.

Referring to FIG. 6, the roots of a channel filter and corresponding roots mirrored in the unit circle for a different channel simulation are shown. Three sets of symbols illustrate these roots. The first set of symbols are the roots of channel filter (+), such as 610. The second set of symbols are the roots mirrored inside the unit circle (x), such as 620. The third set of symbols are the roots of the minimum phase filter found by the spectral factorization, as described above, are displayed as circles (○), such as 630. The roots found by the spectral factorization method were identified by iterating equation (10) ten times. FIG. 6 illustrates a minimum phase filter and its relationship to a channel filter that is not minimum phase for another channel simulation. The spectral factorization method yields, as is shown by a comparison of the roots, essentially the same minimum phase filter. All roots of the channel filter are not shown in FIG. 6, because two roots lie significantly outside the unit circle. Table 2 lists the values as plotted in FIG. 6, and all the roots for the channel filter.

TABLE 2

| Roots of the channel filter | Roots mirrored in the unit circle | Roots of the minimum phase filter |
| --- | --- | --- |
| 0.9970 + 0.2052i | 0.9622 + 0.1981i | 0.9622 + 0.1981i |
| −0.3429 + 1.0461i | −0.2830 + 0.8631i | −0.2830 + 0.8631i |
| 0.1142 − 1.1586i | 0.0843 − 0.8548i | 0.0843 − 0.8548i |
| −1.2868 − 0.1622i | −0.7650 − 0.0964i | −0.7650 − 0.0964i |
| −2.6979 − 0.6838i | −0.3483 − 0.0883i | −0.3483 − 0.0883i |

Figure 7:
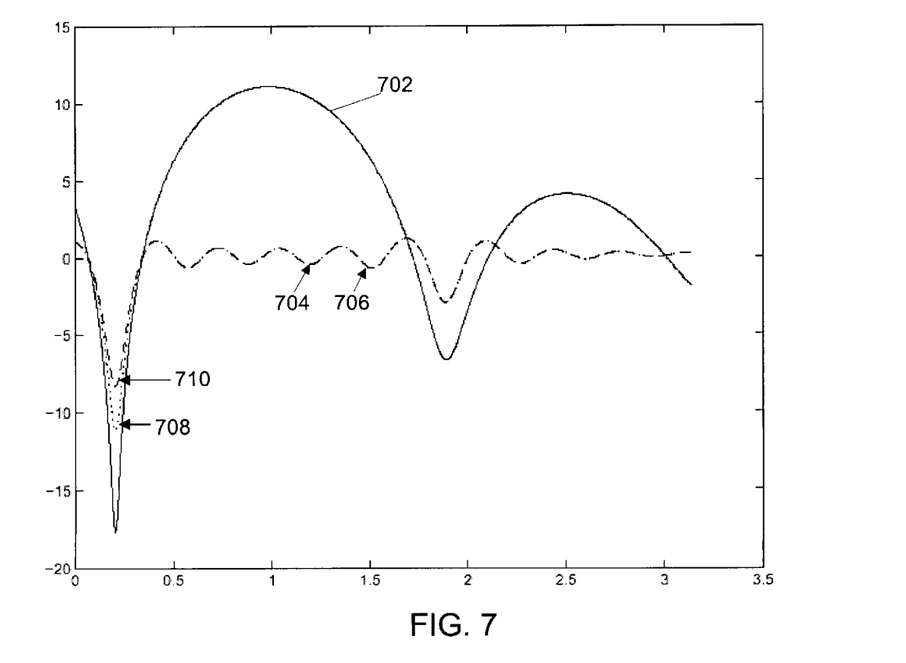
FIG. 7 is a graph of the spectra of a channel in a GSM system for various filters when to few prefilter coefficient are used.

Referring to FIG. 7, another trade-off in the construction of minimum phase prefilters is illustrated. This problem arises when the roots are located close to the unit circle. The spectra of the channel filter 702 is plotted with the spectra of both the root search algorithm 704 and the spectral factorization 706 prefilter designs. The spectrum of the channel filter 702 corresponds to the channel filter of FIG. 6. The spectra of both the root search algorithm 704 and the spectral factorization 706 prefilter designs have large dips, 710 and 708, respectively. The dips 708 and 710 become smaller as the number of taps in the prefilter increases. In this example, it can be seen that the long division in equation (23) (and equation (31)) is truncated too early. The "whiteness" of the prefilter can thus be improved by increasing the number of taps of the prefilter. The prefilters of both FIG. 5 and FIG. 7 have the same number of taps. However, due to the different channel filters, the number of taps in the latter case was not sufficient. Although the root search algorithm is much more computationally complex and exhaustive, as shown in FIG. 7, the resulting prefilter is not better than that achieved by the spectral factorization method of the current invention.

The invention provides a design method for calculating minimum phase prefilters. The method is based on using a spectral factorization approach. The prefilter is constructed from a minimum phase version of an estimated channel impulse response. A system of linear equations is solved for each of the iterations of the spectral factorization. The invention is, unlike most other spectral factorization methods, designed to deal with complex valued filter coefficients. From an implementation point of view, the present invention is appealing because it requires only multiplications, additions and one division for each of the iterations. The proposed method of calculating the prefilter becomes very important as the number of prefilter coefficients are increased. Additionally, the invention describes how to construct prefilters to be used for equalization in both the forward and backward direction. The reduced complexity of the current prefilter design allows for the prefilter to be implemented on processors with reduced computing power.

The minimum phase filter improves the performance of an equalizer using decision feedback. The invention makes the implementation of the minimum phase filter design possible in fixed point Digital Signal Processors (DSPs).

The foregoing examples have been described in the context of prefilters used in hybrid MLSE/DFE systems. For example, the prefilter may focus the energy of radio signals in taps associated with an MLSE portion of a DFSE equalizer. However, those skilled in the art will appreciate that the present invention can be implemented in systems using any type of equalizers, e.g., pure MLSE equalizers.

Therefore, the above-described embodiments should be regarded as illustrative rather than restrictive, and it should be appreciated that variations may be made in those embodiments by workers skilled in the art without departing from the scope of the present invention as defined by the following claims.

What is claimed is:

1. A method of determining filter coefficients in a communication system, comprising the steps of:

estimating a channel over which signals have been transmitted; and determining the filter coefficients for a filter from the channel estimate using a spectral factorization algorithm and iteratively solving a system of linear equations, wherein solving the system of linear equations comprises the steps of:

(a) determining spectrum coefficients of a spectrum of said channel estimate;

(b) initializing current filter coefficients;

(c) creating a complex conjugate matrix containing complex conjugates of the current filter coefficients;

(d) multiplying the inverse of said complex conjugate matrix by a vector containing said spectrum coefficients to obtain next filter coefficients;

(e) setting said current filter coefficients as equal to said next filter coefficients;

(f) determining whether a loop criteria is met;

(g) upon determining that the loop criteria is met, ending the solving step; and (h) upon determining that the loop criteria is not met, looping back to step (c).

2. The method of claim 1, wherein said step of initializing comprises the step of:
   setting said current filter coefficients equal to said spectrum coefficients.
3. The method of claim 1, wherein said loop criteria is met by looping a fixed number of times.
4. The method of claim 3, wherein the fixed number of times is less than 30 times.
5. The method of claim 1, wherein said loop criteria is met by:

$$V = \|s - T^*(g^{(k-1)})g^{(k)}\| < \epsilon$$

where:

V is a criterion for a minimum phase channel;

s is a spectrum of the channel estimate;

$T^*$ is a complex conjugate of the symbol period;

$g^{(k-1)}$ is an estimated phase coefficient at iteration k−1;

$g^{(k)}$ is an estimated phase coefficient at iteration k; and $\epsilon$ is a stop-limit criterion that determines the accuracy of the minimum phase channel.

6. The method of claim 1, wherein said filter coefficients are a minimum phase version of said channel estimate.
7. The method of claim 1, further comprising the step of:
   determining at least one of forward and backward prefilters using said filter coefficients.
8. The method of claim 7, further comprising the step of:
   approximating at least one of forward and backward prefilters as Finite Impulse Response (FIR) filters.
9. A method of determining filter coefficients in a communication system, comprising the steps of:
   estimating a channel over which signals have been transmitted;
   determining the filter coefficients for a filter from the channel estimate using a spectral factorization algorithm; and
   determining at least one of forward and backward prefilters using the filter coefficients by approximating at least one of forward and backward prefilters as Finite Impulse Response (FIR) filters, wherein the step of approximating at least one of the forward and backward prefilters further comprises the steps of:
      determining intermediate coefficients for at least one prefilter;
      reversing the order of said intermediate coefficients for at least one prefilter;
      conjugating the reversed intermediate coefficients for at least one prefilter to form a single set of coefficients; and
      scaling the set of intermediate coefficients to approximate at least one prefilter.
10. A method of determining filter coefficients in a communication system, comprising the steps of:
   estimating a channel over which signals have been transmitted;
   determining the filter coefficients for a filter from the channel estimate using a spectral factorization algorithm; and
   determining at least one of forward and backward prefilters using the filter coefficients, wherein determining the forward prefilter further comprises the steps of:
   calculating the forward prefilter according to:

$$F_f(z) = \frac{H(z)}{G_{fwd}(z)} = f_0 z^M + f_1 z^{M-1} + \ldots + f_M$$

and $$F_{fwd}(z) = \alpha_b z^M F_f^*(z^{-1}).$$

where:

$F_f(z)$ is a Z-transform of a scaled and time-reversed version of the forward prefilter;

H(z) is a Z-transform of the channel estimate;

$G_{fwd}(z)$ is a Z-transform of the filter coefficients from the spectral factorization algorithm;

z is the Z-transform variable;

$f_0$ is the coefficient of $F_f(z)$ with largest degree (i.e. coefficient for $z^M$);

$f_1$ is the coefficient of $F_f(z)$ with second largest degree (i.e. coefficient for $z^{M-1}$);

" ... " is used to denote all values with degree from $z^{M-2}$ to $z^1$;

$f_M$ is the coefficient of $F_f(z)$ with degree zero;

$F_{fwd}(z)$ is a Z-transform of the prefilter to be used in the forward direction;

$\alpha_b$ is an arbitrary constant that scales the forward prefilter; and $F_f^*(z^{-1})$ is $F_f(z)$ with all coefficients complex conjugated and with z replaced with $z^{-1}$.

11. A method of determining filter coefficients in a communication system, comprising the steps of:
   estimating a channel over which signals have been transmitted;
   determining the filter coefficients for a filter from the channel estimate using a spectral factorization algorithm; and
   determining at least one of forward and backward prefilters using the filter coefficients, wherein determining the backward prefilter further comprises the steps of:
   calculating the backward prefilter according to:

$$F_b(z) = \frac{\overline{H}(z)}{\overline{G}_{bwd}(z)} = f_0 z^M + f_1 z^{M-1} + \ldots + f_M$$

and $$\overline{F}_{bwd}(z) = \alpha_b z^M F_b^*(z^{-1}).$$

where:

$F_b(z)$ is a Z-transform of a scaled and time-reversed version of the backward prefilter;

H(z) is a Z-transform of the channel estimate;

$G_{bwd}(z)$ is a Z-transform of the filter coefficients from the spectral factorization algorithm;

$\overline{G}_{bwd}(z)$ is a Z-transform of the filter coefficients from the spectral factorization algorithm with all coefficients complex conjugated;

z is the Z-transform variable;

$f_0$ is the coefficient of $F_b(z)$ with largest degree (i.e. coefficient for $z^M$);

$f_1$ is the coefficient of $F_b(z)$ with second largest degree (i.e. coefficient for $z^{M-1}$);

"..." is used to denote all values with degree from $z^{M-2}$ to $z^1$;

$f_M$ is the coefficient of $F_b(z)$ with degree zero;

$F_{bwd}(z)$ is is a Z-transform of the prefilter to be used in the backward direction;

$\alpha_b$ is an arbitrary constant that scales the forward prefilter; and $F_b^*$ is $F_b(z)$ with all coefficients complex conjugated and with z replaced with $z^{-1}$.

12. A transceiver in a communication system comprising:

a filter;

a channel estimator that estimates a channel over which signals have been transmitted; and a filter design unit that performs a spectral factorization algorithm that determines filter coefficients from said channel estimates, wherein said filter coefficients are used to implement said filter, said filter design unit being adapted to iteratively solve a system of linear equations, by:

(a) determining spectrum coefficients of a spectrum of said channel estimate;

(b) initializing current filter coefficients;

(c) creating a complex conjugate matrix containing complex conjugates of the current filter coefficients;

(d) multiplying the inverse of said complex conjugate matrix by a vector containing said spectrum coefficients to obtain next filter coefficients;

(e) setting said current filter coefficients as equal to said next filter coefficients; (f) determining whether a loop criteria is met;

(g) upon determining that the loop criteria is met, ending the solving step; and (h) upon determining that the loop criteria is not met, looping back to step (c).

13. The transceiver of claim 12, wherein said transceiver is a base station transceiver.

14. The transceiver of claim 12, wherein said transceiver is a mobile terminal transceiver.

15. The transceiver of claim 12, wherein said spectral factorization algorithm generates at least one complex valued filter coefficient.

16. The transceiver of claim 12, wherein said filter coefficients are a minimum phase version of said channel estimate.

17. The method of claim 12, wherein said spectral factorization algorithm does not use a cepstrum of a channel autocorrelation sequence.

18. The method of claim 12, wherein said filter coefficients are determined in a single stage Finite Impulse Response (FIR) approximation.

19. A method of calculating a minimum phase version, $G(z)$, of a channel estimate, $H(z)$, for implementing a prefilter using spectral factorization, comprising the steps of:

(a) initializing coefficients of the minimum phase filter, g, to coefficients of a spectrum of a channel estimate, s, wherein each of said coefficients number from 0 to L;

(b) calculating a division factor, $\gamma_0$, from a complex conjugate of a first coefficient of said minimum phase filter;

(c) calculating a next $L^{th}$ coefficient, $X_L$, of the minimum phase filter by multiplying the $L^{th}$ of said spectrum with said division factor;

(d) establishing a value m of an inner iterative counter as one less than L;

(e) calculating the next $m^{th}$ coefficient, $x_m$, by an equation as follows:

$$x_m = \left(s_m - \sum_{i=m+1}^{L} x_i g_{i-m}^*\right)\gamma_0$$

wherein g* is the complex conjugate of g;

(f) checking the value m, wherein if the value m is equal to zero continue to step (g), else decrement the value m by one and loop to step (e);

(g) equating the coefficients of the minimum phase filter, g, to the next coefficients of the minimum phase filter, x, for each coefficient from 0 to L; and (h) determining whether an outer iterative loop criteria is met;

(i) upon determining that the outer loop criteria is met, ending the method; and (j) upon determining that the outer loop criteria is not met, looping back to step (b).

* * * * *